United States Patent
Sakai et al.

(10) Patent No.: US 11,404,718 B2
(45) Date of Patent: Aug. 2, 2022

(54) SOLID ELECTROLYTE MATERIAL AND BATTERY

(71) Applicant: Panasonic Intellectual Property Management Co., Ltd., Osaka (JP)

(72) Inventors: Akihiro Sakai, Nara (JP); Tetsuya Asano, Nara (JP); Masashi Sakaida, Hyogo (JP); Yusuke Nishio, Osaka (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 287 days.

(21) Appl. No.: 16/912,071

(22) Filed: Jun. 25, 2020

(65) Prior Publication Data

US 2020/0328463 A1   Oct. 15, 2020

Related U.S. Application Data

(63) Continuation of application No. PCT/JP2018/041898, filed on Nov. 13, 2018.

(30) Foreign Application Priority Data

Jan. 5, 2018   (JP) .............................. JP2018-000429

(51) Int. Cl.
  *H01M 10/00*   (2006.01)
  *H01M 10/0562*   (2010.01)
  (Continued)

(52) U.S. Cl.
  CPC ...... *H01M 10/0562* (2013.01); *C01G 25/006* (2013.01); *C01G 27/006* (2013.01);
  (Continued)

(58) Field of Classification Search
  CPC ........... H01M 10/0562; H01M 10/052; H01M 2300/008; Y02E 60/10
  See application file for complete search history.

(56) References Cited

U.S. PATENT DOCUMENTS

2004/0151986 A1   8/2004   Park et al.
2012/0301796 A1   11/2012   Ohtomo et al.
(Continued)

FOREIGN PATENT DOCUMENTS

CN   105254184   1/2016
CN   111201643 A   5/2020
(Continued)

OTHER PUBLICATIONS

G.J. Kipouros et al: ,"Reversible electrode potentials for formation of sold and liquid chlorozirconate and chlorohathale compounds", Canadian Journal of Chemistry, vol. 71, No. 8, Sep. 1, 1993 (Sep. 1, 1003), 1283-1289, XP055768588. (Year: 1993).*

(Continued)

*Primary Examiner* — Cynthia H Kelly
*Assistant Examiner* — Monique M Wills
(74) *Attorney, Agent, or Firm* — McDermott Will & Emery LLP

(57) ABSTRACT

Provided is a solid electrolyte material represented by the following composition formula (1)

$$Li_{3-3\delta-a}Y_{1+\delta-a}M_aCl_{6-x-y}Br_xI_y \qquad \text{Formula (1)}$$

where
M is one or more kinds of elements selected from the group consisting of Zr, Hf, and Ti;
$-1<\delta<2$;
$0<a<1.5$;
$0<(3-3\delta-a)$;
$0<(1+\delta-a)$;
$0 \le x \le 6$;
$0 \le y \le 6$; and
$(x+y) \le 6$.

7 Claims, 4 Drawing Sheets

(51) Int. Cl.
*C01G 25/00* (2006.01)
*C01G 27/00* (2006.01)
*H01M 10/052* (2010.01)

(52) U.S. Cl.
CPC ....... *H01M 10/052* (2013.01); *C01P 2006/40* (2013.01); *H01M 2300/008* (2013.01)

(56) References Cited

U.S. PATENT DOCUMENTS

| | | | |
|---|---|---|---|
| 2016/0285078 | A1 | 9/2016 | Deschamps et al. |
| 2017/0222257 | A1 | 8/2017 | Miyashita et al. |
| 2018/0269537 | A1* | 9/2018 | Yoshima ............ H01M 4/02 |
| 2019/0067736 | A1 | 2/2019 | Yoshioka et al. |
| 2019/0088995 | A1 | 3/2019 | Asano et al. |
| 2020/0343554 | A1 | 10/2020 | Oshima et al. |
| 2020/0350624 | A1 | 11/2020 | Sasaki et al. |

FOREIGN PATENT DOCUMENTS

| | | |
|---|---|---|
| CN | 111587508 A | 8/2020 |
| JP | 2004-235155 | 8/2004 |
| JP | 2005-353309 | 12/2005 |
| JP | 2011-129312 | 6/2011 |
| JP | 2016-024874 | 2/2016 |
| WO | 2017/108105 | 6/2017 |
| WO | 2017/154922 | 9/2017 |
| WO | 2018/025582 | 2/2018 |

OTHER PUBLICATIONS

The Extended European Search Report dated Feb. 4, 2021 for the related European Patent Application No. 18898736.6.

G.J. Kipouros et al: "Reversible electrode potentials for formation of solid and liquid chlorozirconate and chlorohafnate compounds", Canadian Journal of Chemistry, vol. 71, No. 9, Sep. 1, 1993 (Sep. 1, 1993), 1283-1289, XP055768588.

International Search Report of PCT application No. PCT/JP2018/041898 dated Feb. 19, 2019.

Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.

English Translation of Chinese Search Report dated Sep. 7, 2021 for the related Chinese Patent Application No. 201880070896.7.

* cited by examiner

SOLID ELECTROLYTE MATERIAL AND BATTERY

BACKGROUND

1. Technical Field

The present disclosure relates to a solid electrolyte material and a battery.

2. Description of the Related Art

Patent Literature 1 discloses an all-solid battery using a sulfide solid electrolyte.
Non-patent Literature 1 discloses $Li_3YCl_6$.
Non-patent Literature 2 discloses $Li_3YBr_6$.

CITATION LIST

Patent Literature

Patent Literature 1: Japanese Patent Application Publication No. 2011-129312

Non-Patent Literature

Non-patent Literature 1: Z. Anorg. Allg. Chem. 623 (1997), 1067-1073
Non-patent Literature 2: Z. Anorg. Allg. Chem. 623 (1997), 1352-1356

SUMMARY

In the prior art, realization of a solid electrolyte material having high lithium ion conductivity is desired.

The solid electrolyte material in one aspect of the present disclosure is represented by the following composition formula (1)

$$Li_{3-3\delta-a}Y_{1+\delta-a}M_aCl_{6-x-y}Br_xI_y \quad \text{Formula (1)}$$

where
M is one or more kinds of elements selected from the group consisting of Zr, Hf, and Ti;
$-1<\delta<1$;
$0<a<1.5$;
$0<(3-3\delta-a)$;
$0<(1+\delta-a)$;
$0 \leq x \leq 6$;
$0 \leq y \leq 6$; and
$(x+y) \leq 6$.

According to the present disclosure, a solid electrolyte material having high lithium ion conductivity can be realized.

DETAILED DESCRIPTION OF THE EMBODIMENTS

Hereinafter, embodiments of the present disclosure will be described with reference to the drawings.

First Embodiment

The solid electrolyte material in the first embodiment is represented by the following composition formula (1)

$$Li_{3-3\delta-a}Y_{1+\delta-a}M_aCl_{6-x-y}Br_xI_y \quad \text{Formula (1)}$$

where
M is one or more kinds of elements selected from the group consisting of Zr, Hf, and Ti.
Furthermore, $-1<\delta<1$, $0<a<1.5$, $0<(3-3\delta-a)$, $0<(1+\delta-a)$, $0 \leq x \leq 6$, $0 \leq y \leq 6$, and $(x+y) \leq 6$ are satisfied.

According to the above configuration, a halide solid electrolyte material having high lithium ion conductivity can be realized.

In addition, according to the above configuration, an all-solid secondary battery excellent in a charge/discharge characteristic can be realized by using the solid electrolyte material of the first embodiment. In addition, by using the solid electrolyte material of the first embodiment, an all-solid secondary battery which does not include sulfur can be realized. In other words, if exposed to the atmosphere, the solid electrolyte material of the first embodiment does not have a configuration (for example, the configuration of Patent Literature 1) in which hydrogen sulfide is generated. As a result, an all-solid secondary battery which does not generate hydrogen sulfide and is excellent in safety can be realized.

The solid electrolyte material in the first embodiment may satisfy $0.1 \leq a \leq 0.9$ in the above composition formula (1).

According to the above configuration, a solid electrolyte material having higher lithium ion conductivity can be realized.

The solid electrolyte material in the first embodiment may satisfy $0.3 \leq a \leq 0.7$ in the composition formula (1).

According to the above configuration, a solid electrolyte material having higher lithium ion conductivity can be realized.

The solid electrolyte material in the first embodiment may satisfy $-0.4 \leq \delta \leq 0.4$ in the above composition formula (1).

According to the above configuration, a solid electrolyte material having higher lithium ion conductivity can be realized.

The solid electrolyte material in the first embodiment may satisfy $-0.2 \leq \delta \leq 0.2$ in the above composition formula (1).

According to the above configuration, a solid electrolyte material having higher lithium ion conductivity can be realized.

The solid electrolyte material in the first embodiment may satisfy $-0.1 \leq \delta \leq 0.1$ in the above composition formula (1).

According to the above configuration, a solid electrolyte material having higher lithium ion conductivity can be realized.

The solid electrolyte material in the first embodiment may be crystalline or amorphous.

In addition, a shape of the solid electrolyte material in the first embodiment is not specifically limited, for example, may be an acicular shape, a spherical shape, or an elliptical spherical shape. For example, the solid electrolyte material in the first embodiment may be particles. In addition, the solid electrolyte material in the first embodiment may be formed into a pellet shape or a plate shape by pressurization after stacking a plurality of particles.

For example, if the shape of the solid electrolyte material in the first embodiment is particulate (for example, spherical), the median diameter thereof may be not less than 0.1 µm and not more than 100 µm.

In the first embodiment, the median diameter may be not less than 0.5 µm and not more than 10 µm.

According to the above configuration, ionic conductivity can be improved more. In addition, a better dispersion state of the solid electrolyte material in the first embodiment and an active material can be formed.

In the first embodiment, the solid electrolyte material may be smaller than the median diameter of the active material.

According to the above configuration, a better dispersion state of the solid electrolyte material in the first embodiment and the active material can be formed.

<Manufacturing Method of Solid Electrolyte Material>

The solid electrolyte material in the first embodiment may be manufactured by the following method, for example.

Binary halide raw material powders are prepared so as to have a blending ratio of a target composition. For example, if $Li_{2.5}Y_{0.5}Zr_{0.5}Cl_6$ is produced, LiCl, $YCl_3$, and $ZrCl_4$ are prepared in a molar ratio of about 2.5:0.5:0.5. In consideration of the change in composition during a synthesis process, the blending ratio may be adjusted in advance so as to cancel the change. The above-mentioned values "δ", "a", "x", and "y" can be adjusted by adjusting the raw materials, the blending ratio, and the synthesis process.

After mixing the raw material powders well, the raw material powders are mixed and ground using a mechanochemical milling method to react. Then, the reaction product may be sintered in a vacuum or in an inert atmosphere.

Alternatively, the raw material powders may be mixed well, and then sintered in a vacuum or in an inert atmosphere. It is desirable that the sintering is performed for one hour or longer within a range of 100° C. to 350° C.

Thereby, the solid electrolyte material including the composition as described above is provided.

Second Embodiment

Hereinafter, the second embodiment will be described. The description which has been set forth in the above-described first embodiment is omitted appropriately.

The battery in the second embodiment is configured using the solid electrolyte material described in the first embodiment.

The battery in the second embodiment comprises a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material in the first embodiment.

According to the above configuration, the charge/discharge characteristic of the battery can be improved.

A specific example of the battery in the second embodiment will be described below.

Figure 1:
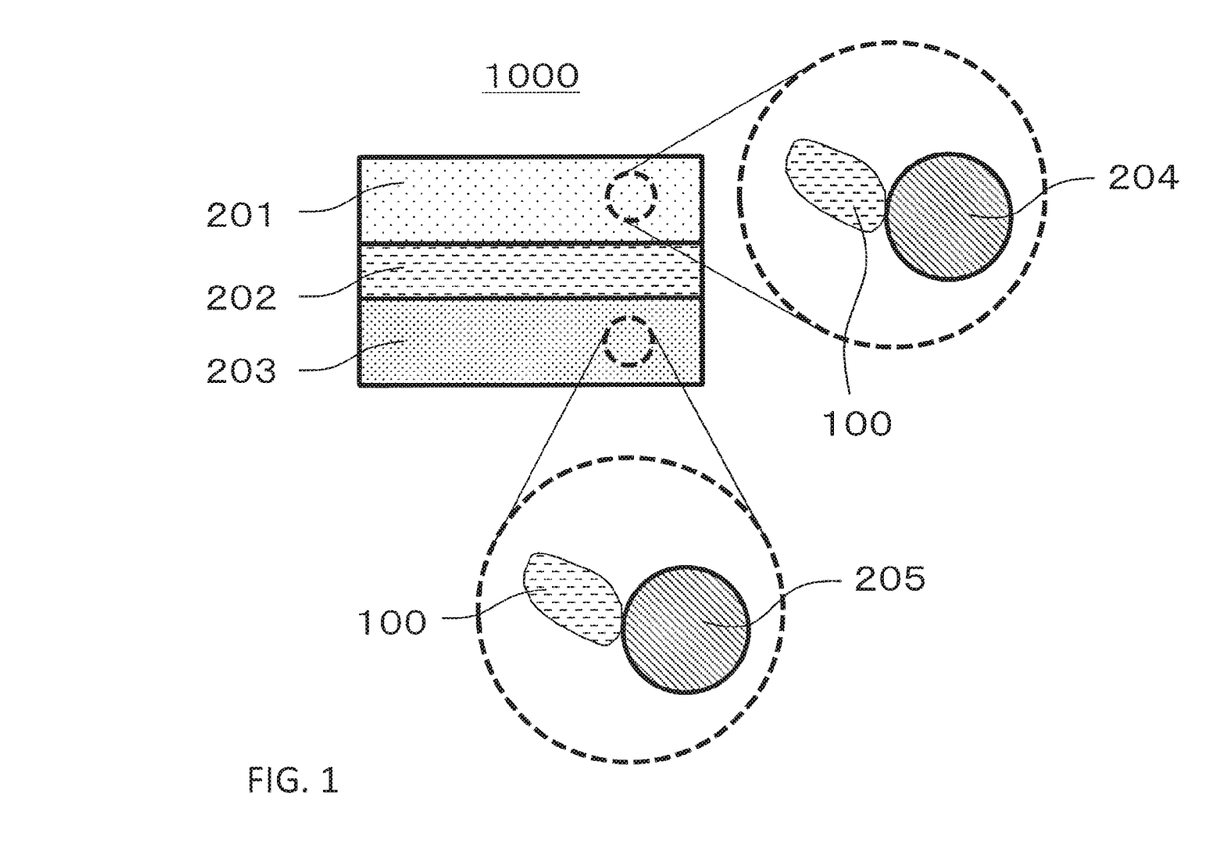
FIG. 1 is a cross-sectional view showing a schematic configuration of a battery in a second embodiment.

FIG. 1 is a cross-sectional view showing a schematic configuration of a battery 1000 in the second embodiment.

The battery 1000 in the second embodiment comprises a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (for example, a solid electrolyte material).

The negative electrode 203 includes negative electrode active material particles 205 and the solid electrolyte particles 100.

The solid electrolyte particles 100 are particles each consisting of the solid electrolyte material in the first embodiment or particles each including the solid electrolyte material in the first embodiment as a main component.

The positive electrode 201 includes a material having a characteristic of storing and releasing metal ions (for example, lithium ions). The positive electrode 201 includes, for example, a positive electrode active material (for example, the positive electrode active material particles 204).

As the positive electrode active material, for example, a lithium-containing transition metal oxide (e.g., Li(NiCoAl)$O_2$, or $LiCoO_2$), a transition metal fluoride, a polyanion material, a fluorinated polyanion material, a transition metal sulfide, a transition metal oxyfluoride, a transition metal oxysulfide, and a transition metal oxynitride can be used.

The median diameter of each of the positive electrode active material particles 204 may be not less than 0.1 µm and not more than 100 µm. If the median diameter of each of the positive electrode active material particles 204 is not less than 0.1 µm, the positive electrode active material particles 204 and the halide solid electrolyte material can form a good dispersion state in the positive electrode. As a result, the charge/discharge characteristic of the battery is improved. In addition, if the median diameter of each of the positive electrode active material particles 204 is not more than 100 µm, lithium diffusion in the positive electrode active material particles 204 is accelerated. As a result, the battery can operate at a high output.

The median diameter of each of the positive electrode active material particles 204 may be larger than the median diameter of the halide solid electrolyte material. Thereby, the favorable dispersion state of the positive electrode active material particle 204 and the halide solid electrolyte material can be formed.

With regard to a volume ratio "v:100−v" between the positive electrode active material particles 204 and the halide solid electrolyte material included in the positive electrode 201, 30≤v≤95 may be satisfied. In a case of 30≤v, a sufficient battery energy density can be secured. In addition, if v≤95, an operation at a high output can be realized.

The thickness of the positive electrode 201 may be not less than 10 µm to not more than 500 µm. If the thickness of the positive electrode is 10 µm or more, a sufficient battery energy density can be ensured. In addition, if the thickness of the positive electrode is 500 µm or less, an operation at a high output can be realized.

The electrolyte layer 202 is a layer including an electrolyte material. The electrolyte material is, for example, a solid electrolyte material. In other words, the electrolyte layer 202 may be a solid electrolyte layer.

The solid electrolyte layer may be composed only of the solid electrolyte material in the first embodiment.

Alternatively, the solid electrolyte layer may be composed only of a solid electrolyte material different from the solid electrolyte material in the first embodiment. As the solid electrolyte material different from the solid electrolyte material in the first embodiment, for example, $Li_2MgX_4$, $Li_2FeX_4$, $Li(Al, Ga, In)X_4$, $Li_3(Al, Ga, In)X_6$, or LiI may be used. Here, X includes at least one selected from the group consisting of Cl, Br, and I.

The solid electrolyte layer may include simultaneously the solid electrolyte material in the first embodiment and the solid electrolyte material different from the solid electrolyte material in the first embodiment. At this time, both may be dispersed uniformly. Alternatively, the layer formed of the solid electrolyte material in the first embodiment and the layer formed of the solid electrolyte material different from the solid electrolyte material in the first embodiment are sequentially arranged in the stacking direction of the battery.

The thickness of the solid electrolyte layer may be not less than 1 μm and not more than 100 μm. If the thickness of the solid electrolyte layer is not less than 1 μm, the positive electrode 201 and the negative electrode 203 are easily separated. In addition, if the thickness of the solid electrolyte layer is not more than 100 μm, an operation at a high output can be realized.

The negative electrode 203 includes a material having a characteristic of storing and releasing metal ions (for example, lithium ions). The negative electrode 203 includes, for example, a negative electrode active material (for example, negative electrode active material particles 205).

As the negative electrode active material, a metal material, a carbon material, an oxide, a nitride, a tin compound, or a silicon compound can be used. The metal material may be a single metal. Alternatively, the metal material may be an alloy. Examples of the metal material include lithium metal and lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound can be used. If a negative electrode active material having a low average reaction voltage is used, the effect of suppressing electrolysis by the solid electrolyte material in the first embodiment is better exhibited.

The median diameter of each of the negative electrode active material particles 205 may be not less than 0.1 μm and not more than 100 μm. If the median diameter of each of the negative electrode active material particles 205 is not less than 0.1 μm, the negative electrode active material particles 205 and the solid electrolyte particles 100 can form a good dispersion state in the negative electrode. As a result, the charge/discharge characteristic of the battery is improved. In addition, if the median diameter of each of the negative electrode active material particles 205 is not more than 100 μm, the lithium diffusion in the negative electrode active material particles 205 is accelerated. For this reason, the battery can operate at a high output.

The median diameter of each of the negative electrode active material particles 205 may be larger than the median diameter of the solid electrolyte particles 100. As a result, the favorable dispersion state of the negative electrode active material particle 205 and the halide solid electrolyte material can be formed.

With regard to the volume ratio "v:100−v" of the negative electrode active material particles 205 and the solid electrolyte particles 100 included in the negative electrode 203, $30 \le v \le 95$ may be satisfied. In a case of $30 \le v$, a sufficient battery energy density can be secured. In addition, if $v \le 95$, an operation at a high output can be realized.

The thickness of the negative electrode 203 may be not less than 10 μm and not more than 500 μm. If the thickness of the negative electrode is not less than 10 μm, the sufficient battery energy density can be secured. In addition, if the thickness of the positive electrode is not more than 500 μm, an operation at a high output can be realized.

At least one of the positive electrode 201, the electrolyte layer 202, and the negative electrode 203 may include a sulfide solid electrolyte or an oxide solid electrolyte for the purpose of improving ionic conductivity, chemical stability, and electrochemical stability. As the sulfide solid electrolyte, $Li_2S$—$P_2S_5$, $Li_2S$—$SiS_2$, $Li_2S$—$B_2S_3$, $Li_2S$—$GeS_2$, or $Li_{3.25}Ge_{0.25}P_{0.75}S_4$, $Li_{10}GeP_2S_{12}$ can be used. As the oxide solid electrolyte, a NASICON solid electrolyte typified by $LiTi_2(PO_4)_3$ and its element substitution, a $(LaLi)TiO_3$ perovskite solid electrolyte, a LISICON solid electrolyte typified by $Li_{14}ZnGe_4O_{16}$, $Li_4SiO_4$, or $LiGeO_4$ and its element substitution, a garnet solid electrolyte typified by $Li_7La_3Zr_2O_{12}$ and its element substitution, $Li_3N$ and its H substitution, or $Li3_PO_4$ and its N substitution can be used.

At least one of the positive electrode 201, the electrolyte layer 202, and the negative electrode 203 may include an organic polymer solid electrolyte for the purpose of increasing ionic conductivity. As the organic polymer solid electrolyte, for example, a compound of a polymer compound and a lithium salt can be used. The polymer compound may have an ethylene oxide structure. Since the polymer compound has the ethylene oxide structure, a large amount of lithium salt can be included, and the ionic conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

At least one of the positive electrode 201, the electrolyte layer 202, and the negative electrode 203 may include a non-aqueous electrolyte solution, a gel electrolyte, and an ionic liquid for the purpose of facilitating exchange of lithium ions and improving the output characteristic of the battery.

The non-aqueous electrolyte solution includes a non-aqueous solvent and a lithium salt dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent can be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these can be used alone. Alternatively, a combination of two or more non-aqueous solvents selected from these can be used as the non-aqueous solvent. The non-aqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, LiN $(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt. The concentration of the lithium salt is, for example, in the range of 0.5 to 2 mol/liter.

As the gel electrolyte, a polymer material including the non-aqueous electrolyte solution can be used. As the polymer material, polyethylene oxide, polyacrylonitrile, polyvinylidene fluoride, polymethyl methacrylate, or a polymer having an ethylene oxide bond may be used.

The cation which forms the ionic liquid is an aliphatic chain quaternary salt such as tetraalkylammonium or tetraalkylphosphonium, an aliphatic cyclic ammonium such as pyrrolidinium, morpholinium, imidazolinium, tetrahydropyrimidinium, piperazinium or piperidinium, a nitrogen-including heterocyclic aromatic cation such as pyridinium or imidazolium. The anion which forms the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. In addition, the ionic liquid may contain a lithium salt.

At least one of the positive electrode 201, the electrolyte layer 202, and the negative electrode 203 may include a binder for the purpose of improving adhesion between the particles. The binder is used to improve the binding property of the material which forms the electrode. The binders include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene butadiene rubber, or carboxymethylcellulose. The binder includes a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. In addition, two or more kinds selected from these may be mixed and used as a binder.

In addition, at least one of the positive electrode 201 and the negative electrode 203 may include a conductive agent as necessary.

The conductive agent is used to lower electrode resistance. Examples of the conductive agent include graphite such as natural graphite or artificial graphite, carbon black such as acetylene black or ketjen black, a conductive fiber such as a carbon fiber or a metal fiber, a metal powder such as carbon fluoride or aluminum, a conductive whisker such as zinc oxide or potassium titanate, a conductive metal oxide such as titanium oxide, or a conductive polymer compound such as polyaniline, polypyrrole, or polythiophene. In addition, cost reduction can be achieved by using carbon conductive agent as the conductive agent.

Note that the battery in the second embodiment can be configured as a battery having various shapes such as a coin shape, a cylindrical shape, a prism shape, a sheet shape, a button shape, a flat shape, or a laminated shape.

EXAMPLES

Hereinafter, details of the present disclosure will be described with reference to inventive examples and comparative examples.

Inventive Example 1

[Production of Solid Electrolyte Material]

In an argon atmosphere with a dew point of −60° C. or less, raw material powders LiCl, $YCl_3$, and $ZrCl_4$ were prepared at a molar ratio of $LiCl:YCl_3:ZrCl_4=2.9:0.9:0.1$. These were ground and mixed in a mortar. Subsequently, milling processing was performed at 600 rpm for 25 hours using a planetary ball mill.

Thus, a powder of the solid electrolyte material of the inventive example 1 represented by the composition formula of $Li_{2.9}Y_{0.9}Zr_{0.1}Cl_6$ was provided.

The content of Li per unit weight in the whole of the solid electrolyte material of the inventive example 1 was measured by atomic absorption spectrometry. The content of Y was measured by ICP emission spectroscopy. The Li:Y:Zr content was converted into a molar ratio. The ratio of Li:Y:Zr was 2.9:0.9:0.1, which was the same as the ratio of the raw material powders.

[Evaluation of Lithium Ion Conductivity]

Figure 2:
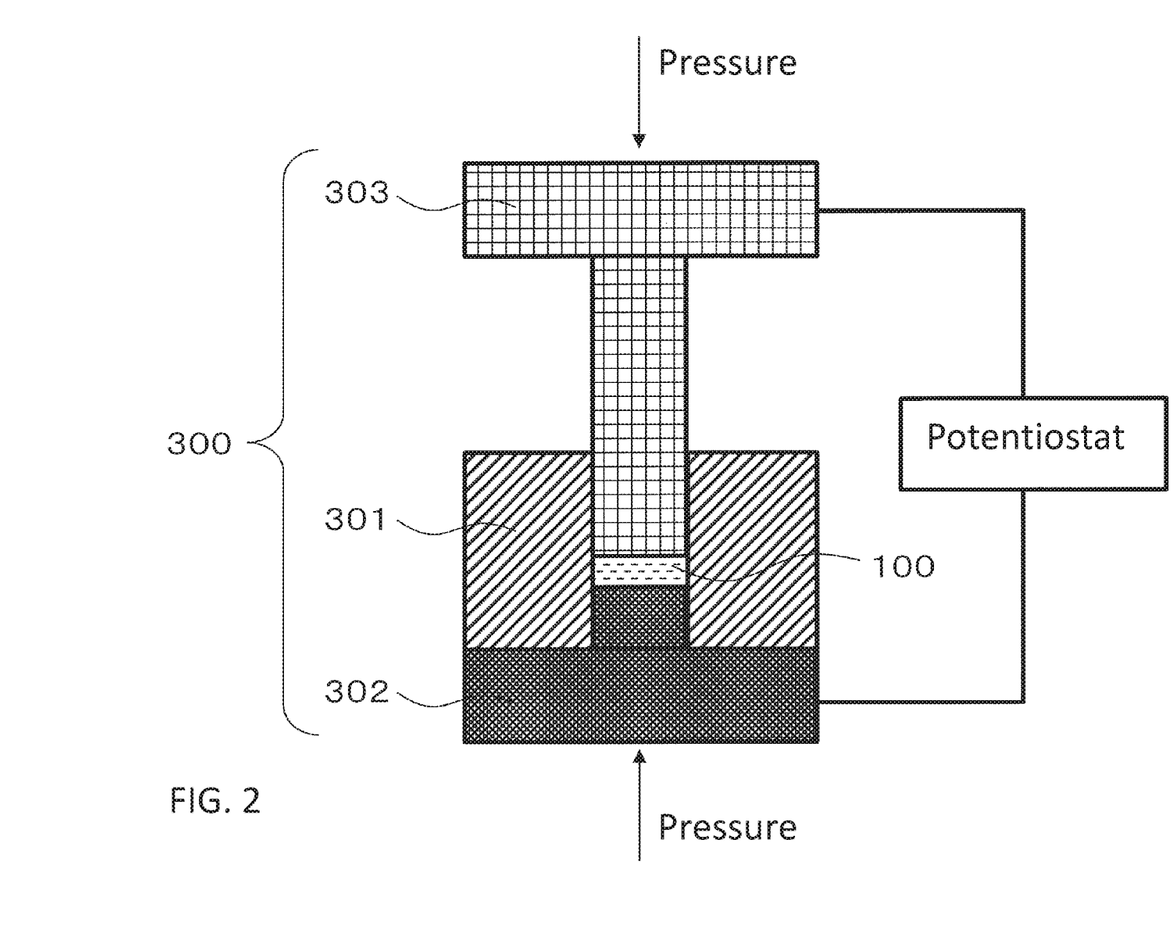
FIG. 2 is a schematic diagram illustrating an evaluation method of ionic conductivity.

FIG. 2 is a schematic diagram showing an evaluation method of ionic conductivity.

The pressure-molding die 300 is composed of a frame 301 formed of an electronically insulating polycarbonate, an upper punch part 303 and a lower punch part 302, both of which are formed of electron conductive stainless steel.

Using the configuration shown in FIG. 2, the ionic conductivity was evaluated by the following method.

In a dry atmosphere with a dew point of −30° C. or lower, the inside of the pressure-molding die 300 was filled with the powder of the solid electrolyte material of the inventive example 1 (an inventive example of the solid electrolyte particle 100). The powder was uniaxially pressurized at 400 MPa to produce a conductivity measurement cell of the inventive example 1.

In a pressurized state, lead wires were routed from the upper punch part 303 and the lower punch part 302, connected to a potentiostat (Princeton Applied Research, VersaSTAT4) equipped with a frequency response analyzer. The ionic conductivity at room temperature was measured by an electrochemical impedance measurement method.

Figure 3:
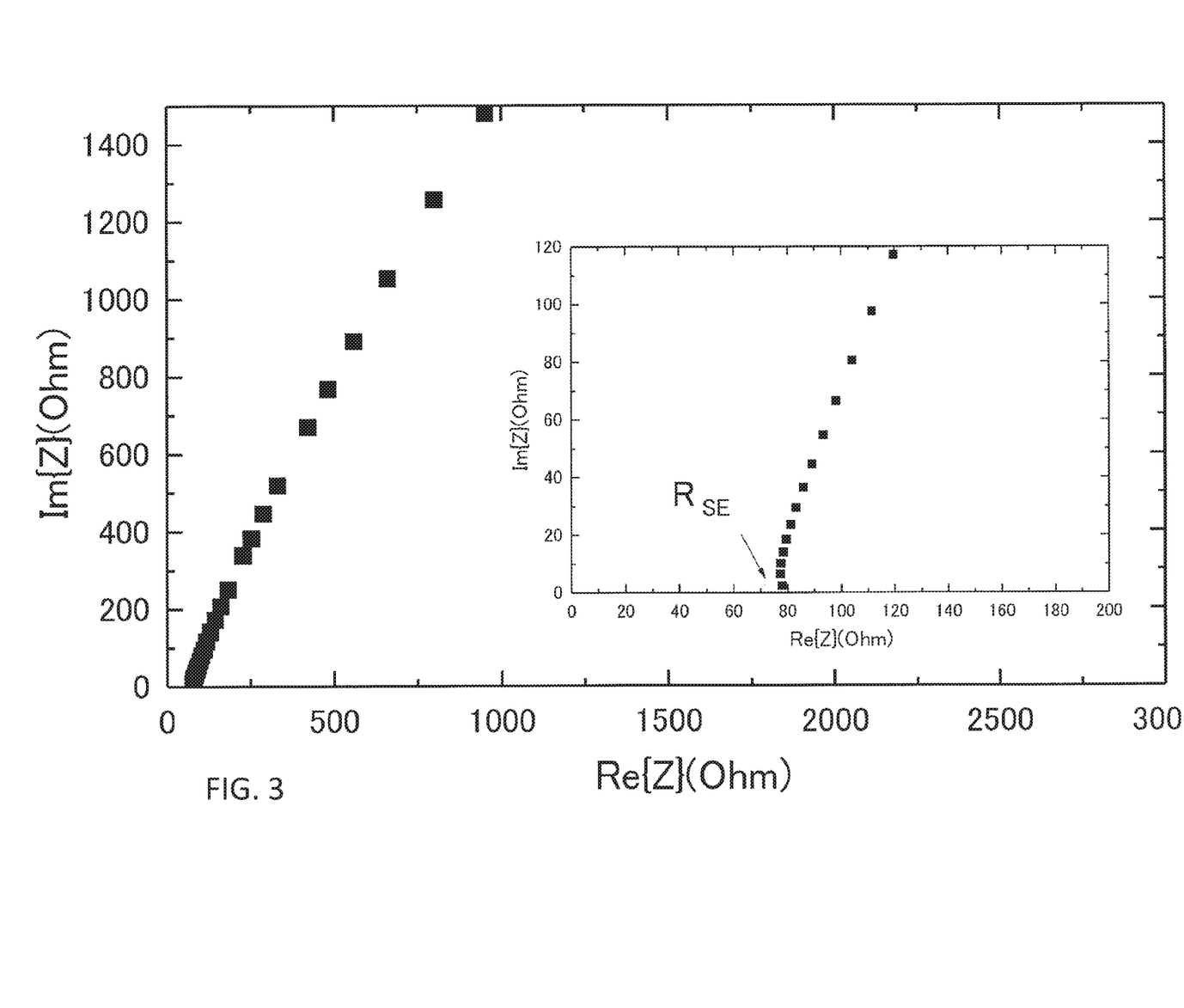
FIG. 3 is a graph showing an evaluation result of the ionic conductivity by AC impedance measurement.

FIG. 3 shows a Cole-Cole diagram of the result of the impedance measurement.

In FIG. 3, the real value of the impedance at the measurement point (arrow in FIG. 3) having the smallest absolute value of the phase of the complex impedance was deemed to be the resistance value for ionic conduction of the solid electrolyte of the inventive example 1.

Ionic conductivity was calculated from the following formula (2) using the resistance value of the electrolyte.

$$\sigma = (R_{SE} \times S/t)^{-1} \quad (2)$$

where σ is the ionic conductivity, S is the electrolyte area (inner diameter of the frame 301 in FIG. 2), and R is the resistance value of the solid electrolyte in the above impedance measurement, t is the thickness of the electrolyte (in FIG. 2, the thickness of the pressured body of the plurality of the solid electrolyte particles 100).

The ionic conductivity of the solid electrolyte material of the inventive example 1 measured at 25° C. was $7.5 \times 10^{-4}$ S/cm.

[Production of Secondary Battery]

In an argon glove box, the solid electrolyte material of the inventive example 1 and $LiCoO_2$, which is an active material, were prepared at a volume ratio of 70:30. These were mixed in an agate mortar to produce a mixture.

In the insulating outer cylinder, the solid electrolyte material of the inventive example 1 which corresponded to a thickness of 700 μm, 8.54 mg of the above mixture, and 14.7 mg of Al powder were stacked in the order. These were pressure-molded at a pressure of 300 MPa to provide a first electrode and a solid electrolyte layer.

Next, a metal In (thickness: 200 μm) was stacked on the opposite side to the side which was in contact with the first electrode of the solid electrolyte layer. This was pressure-molded at a pressure of 80 MPa to produce a stacking structure consisting of the first electrode, the solid electrolyte layer, and a second electrode.

Next, stainless-steel current collectors were disposed on the upper and lower parts of the stacking structure, and current collector leads were attached to the current collectors.

Finally, an insulating ferrule was used to block and seal the inside of the insulating outer cylinder from the outside atmosphere.

Thus, the secondary battery of the inventive example 1 was produced.

[Charge/Discharge Test]

Figure 4:
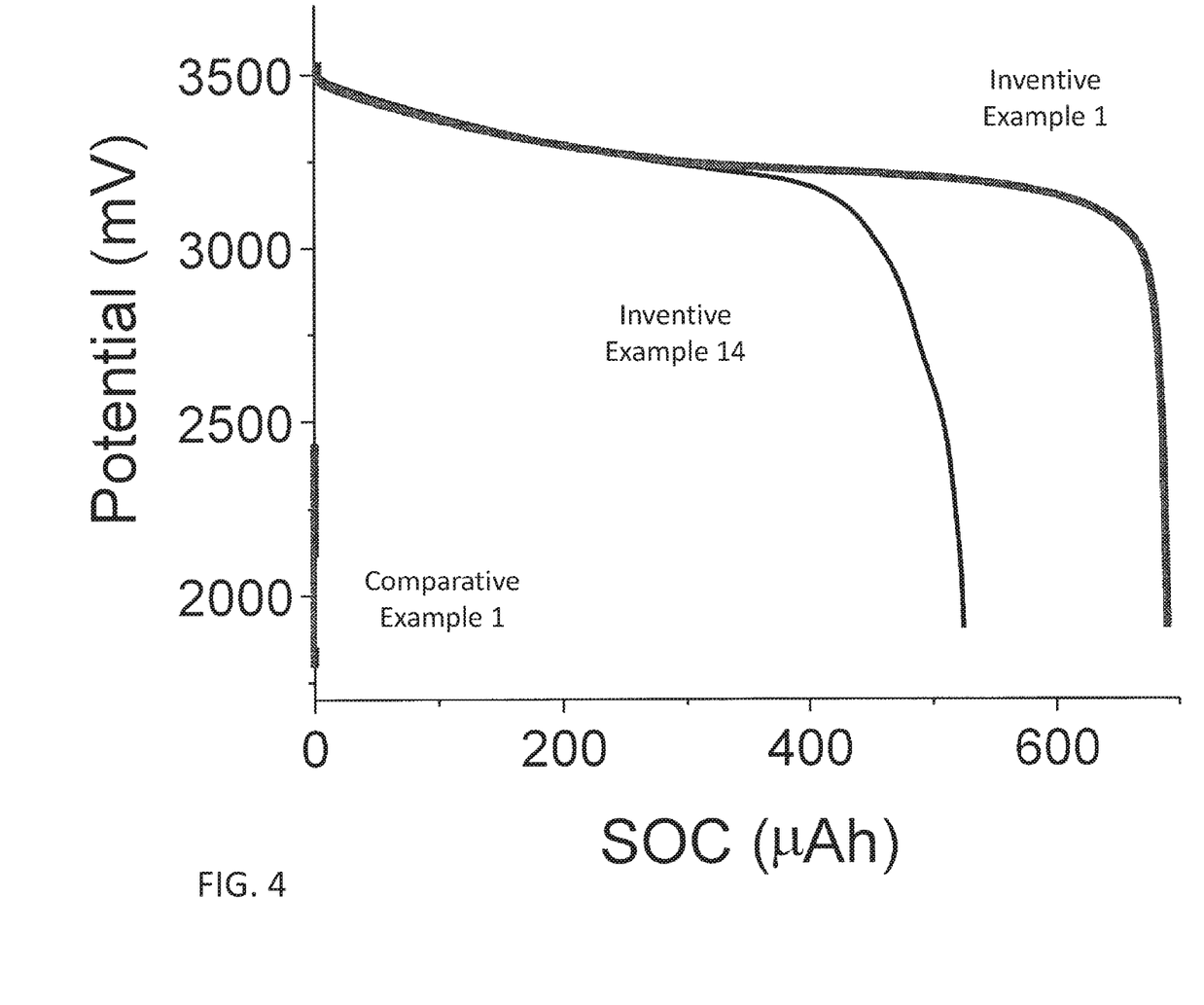
FIG. 4 is a graph showing an initial discharge characteristic.

FIG. 4 is a graph showing initial discharge characteristics. The results shown in FIG. 4 were measured by the following method.

In other words, the secondary battery of the inventive example 1 was disposed in a thermostatic chamber at 25° C.

Constant current charging was performed at a current value of 0.05 C rate (20 hour rate) with respect to a theoretical capacity of the battery, and the charging was terminated at a voltage of 3.6 V.

The battery was discharged at a current value of 0.05 C rate, and the discharge was terminated at a voltage of 1.9V.

As a result of the measurement, the initial discharge capacity of the secondary battery of the inventive example 1 was 620 pAh.

Inventive Examples 2 to 41

Hereinafter, synthesis and evaluation methods of $Li_{3-3\delta-a}Y_{1+\delta-a}M_aCl_{6-x-y}Br_xI_y$ will be described.

[Production of Solid Electrolyte Material]

In the inventive examples 2 to 41, the raw material powders were prepared in a glove box maintained in a dry/low oxygen atmosphere having a dew point of −90° C. or less and an oxygen value of 5 ppm or less.

In the inventive examples 2 to 21, the raw material powders LiCl, YCl$_3$, and ZrCl$_4$ were prepared in such a way that LiCl:YCl$_3$:ZrCl$_4$=(3−3δ−a):(1+δ−a): a at a molar ratio.

In the inventive examples 22 to 28, the raw material powders LiCl, YCl$_3$, and HfCl$_4$ were prepared in such a way that LiCl:YCl$_3$:HfCl$_4$=(3−3δ−a):(1+δ−a): a at a molar ratio.

In the inventive example 29, the raw material powders LiCl, LiBr, YCl$_3$, and ZrCl$_4$ were prepared in such a way that LiCl:LiBr:YCl$_3$:ZrCl$_4$=1.5:1:0.5:0.5 at a molar ratio.

In the inventive example 30, the raw material powders LiCl, LiBr, YBr$_3$, and ZrCl$_4$ were prepared in such a way that LiCl:LiBr:YBr$_3$:ZrCl$_4$=1:1.5:0.5:0.5 at a molar ratio.

In the inventive example 31, the raw material powders LiCl, LiI, YCl$_3$, and ZrCl$_4$ were prepared in such a way that LiCl:LiI:YCl$_3$:ZrCl$_4$=1.5:1:0.5:0.5 at a molar ratio.

In the inventive example 32, the raw material powders LiCl, LiI, YI$_3$, and ZrCl$_4$ were prepared in such a way that LiCl:LiI:YI$_3$:ZrCl$_4$=1:1.5:0.5:0.5 at a molar ratio.

In the inventive example 33, the raw material powders LiBr, LiI, YBr$_3$, and ZrCl$_4$ were prepared in such a way that LiBr:LiI:YBr$_3$:ZrCl$_4$=0.5:2:0.5:0.5 at a molar ratio.

In the inventive example 34, the raw material powders LiCl, LiBr, YBr$_3$, and HfCl$_4$ were prepared in such a way that LiCl:LiBr:YBr$_3$:HfCl$_4$=1:1.5:0.5:0.5 at a molar ratio.

In the inventive example 35, the raw material powders LiCl, LiI, YI$_3$, and HfCl$_4$ were prepared in such a way that LiCl:LiI:YI$_3$:HfCl$_{14}$=1:1.5:0.5:0.5 at a molar ratio.

In the inventive example 36, the raw material powders LiBr, LiI, YBr$_3$, and HfCl$_4$ were prepared in such a way that LiBr:LiI:YBr$_3$:HfCl$_4$=0.5:2:0.5:0.5 at a molar ratio.

In the inventive examples 37 to 41, the raw material powders LiCl, YCl$_3$, and ZrCl$_{24}$ were prepared in such a way that LiCl:YCl$_3$:ZrCl$_4$=(3−a):(1−a):a.

In the inventive examples 37 to 41, after the milling processing using the planetary ball mill, heat treatment was performed at 250° C. for 1 hour in an Ar atmosphere.

Except for these, the solid electrolyte materials of the inventive examples 2 to 41 were prepared in the same manner as in the above-described inventive example 1.

In each of the inventive examples 2 to 41, "value of δ", "value of a", and "element kind of M" are shown in Table 1, which will be described later.

[Evaluation of Lithium Ion Conductivity]

Conductivity measurement cells of the inventive examples 2 to 41 were produced in the same manner as in the above-described inventive example 1 in a glove box maintained in a dry/low oxygen atmosphere with a dew point of −90° C. or less and an oxygen value of 5 ppm or less.

Except for this, ionic conductivity was measured in the same manner as in the above-described inventive example 1.

The ionic conductivity in the above-described inventive examples 2 to 41 is shown in Table 1, which will be described later.

[Production of Secondary Battery]

In a glove box maintained in a dry/low oxygen atmosphere with a dew point of −90° C. or less and an oxygen value of 5 ppm or less, each of the solid electrolyte material of the inventive examples 2 to 41 and LiCoO$_2$, which was a positive electrode active material, were prepared at a volume ratio of 30:70. These were mixed in an agate mortar to prepare each positive electrode mixture of the inventive examples 2 to 41.

Except for these, secondary batteries of the inventive examples 2 to 41 were produced in the same manner as in the above-described inventive example 1.

[Charge/Discharge Test]

A charge/discharge test of each of the secondary batteries of the inventive examples 2 to 41 was performed in the same manner as in the above-described inventive example 1.

FIG. 4 shows an initial discharge characteristic of the inventive example 14 as a typical initial discharge characteristic. The initial discharge capacity of the inventive example 14 was 520 μAh.

The initial discharge characteristics of the inventive examples 2 to 13 and the inventive examples 15 to 41 were the same as those of the inventive example 1 and the inventive example 14, respectively, and good charge/discharge characteristics were provided.

Comparative Example 1

LiCl and FeCl$_2$ were used as raw material powders for a solid electrolyte, and mixed at a molar ratio of LiCl:FeCl$_2$=2:1.

Except for this, the synthesis, the evaluation and the analysis were carried out in the same manner as in the inventive example 1 above.

The ionic conductivity measured at 22° C. was $9 \times 10^{-6}$ S/cm.

In addition, the solid electrolyte material of the comparative example 1 was used as a solid electrolyte used for the mixture and the solid electrolyte layer.

Except for this, a secondary battery was produced and a charge/discharge test was performed in the same manner as in the above-described inventive example 1.

The initial discharge capacity of the secondary battery of the inventive examples was not more than 1 μAh, and the charge/discharge operation thereof was not observed.

Table 1 shows the configurations and evaluation results in the above-described inventive examples 1 to 41 and the comparative example 1.

examples 22 to 24, and (C) the inventive examples 37 to 41, if the value of a is within the range of 0.3 a≤0.7, higher ionic conductivity is exhibited, in a case of the same composition except for a.

Further, if the value of δ, which indicates the amount of Li deficiency from the stoichiometric ratio, is $-0.4 \leq \delta \leq 0.4$, higher ionic conductivity is exhibited (see the inventive examples 1 to 41). In addition, as understood from (A) the inventive examples 2 and 6 to 10, (B) the inventive examples 3 and 11 to 16, (C) the inventive examples 4 and 17 to 21, and (D) the inventive examples 23 and 25, if the value of δ is within the range of $-0.2 \leq \delta \leq 0.2$, higher ionic conductivity is exhibited, in a case of the same composition

TABLE 1

| Inventive Example | Composition | Anion | a | δ | M | Synthesis Method | Conductivity ($\times 10^{-4}$ S/cm) |
|---|---|---|---|---|---|---|---|
| Inventive Example 1 | $Li_{2.9}Y_{0.9}Zr_{0.1}Cl_6$ | Cl | 0.1 | 0 | Zr | BM | 7.5 |
| Inventive Example 2 | $Li_{2.7}Y_{0.7}Zr_{0.3}Cl_6$ | Cl | 0.3 | 0 | Zr | BM | 10 |
| Inventive Example 3 | $Li_{2.5}Y_{0.5}Zr_{0.5}Cl_6$ | Cl | 0.5 | 0 | Zr | BM | 15 |
| Inventive Example 4 | $Li_{2.3}Y_{0.3}Zr_{0.7}Cl_6$ | Cl | 0.7 | 0 | Zr | BM | 16 |
| Inventive Example 5 | $Li_{2.1}Y_{0.1}Zr_{0.9}Cl_6$ | Cl | 0.9 | 0 | Zr | BM | 8 |
| Inventive Example 6 | $Li_{3.9}Y_{0.3}Zr_{0.3}Cl_6$ | Cl | 0.3 | −0.4 | Zr | BM | 1 |
| Inventive Example 7 | $Li_{3.3}Y_{0.5}Zr_{0.3}Cl_6$ | Cl | 0.3 | −0.2 | Zr | BM | 3.5 |
| Inventive Example 8 | $Li_{3.0}Y_{0.6}Zr_{0.3}Cl_6$ | Cl | 0.3 | −0.1 | Zr | BM | 6.6 |
| Inventive Example 9 | $Li_{2.4}Y_{0.8}Zr_{0.3}Cl_6$ | Cl | 0.3 | 0.1 | Zr | BM | 4.2 |
| Inventive Example 10 | $Li_{2.1}Y_{0.9}Zr_{0.3}Cl_6$ | Cl | 0.3 | 0.2 | Zr | BM | 3.7 |
| Inventive Example 11 | $Li_{3.7}Y_{0.1}Zr_{0.5}Cl_6$ | Cl | 0.5 | −0.4 | Zr | BM | 0.5 |
| Inventive Example 12 | $Li_{3.1}Y_{0.3}Zr_{0.5}Cl_6$ | Cl | 0.5 | −0.2 | Zr | BM | 3.2 |
| Inventive Example 13 | $Li_{2.8}Y_{0.4}Zr_{0.5}Cl_6$ | Cl | 0.5 | −0.1 | Zr | BM | 10.2 |
| Inventive Example 14 | $Li_{2.2}Y_{0.6}Zr_{0.5}Cl_6$ | Cl | 0.5 | 0.1 | Zr | BM | 11.5 |
| Inventive Example 15 | $Li_{1.9}Y_{0.7}Zr_{0.5}Cl_6$ | Cl | 0.5 | 0.2 | Zr | BM | 4.5 |
| Inventive Example 16 | $Li_{1.3}Y_{0.9}Zr_{0.5}Cl_6$ | Cl | 0.5 | 0.4 | Zr | BM | 0.9 |
| Inventive Example 17 | $Li_{2.9}Y_{0.1}Zr_{0.7}Cl_6$ | Cl | 0.7 | −0.2 | Zr | BM | 7.2 |
| Inventive Example 18 | $Li_{2.6}Y_{0.2}Zr_{0.7}Cl_6$ | Cl | 0.7 | −0.1 | Zr | BM | 8.5 |
| Inventive Example 19 | $Li_{2.0}Y_{0.4}Zr_{0.7}Cl_6$ | Cl | 0.7 | 0.1 | Zr | BM | 8.2 |
| Inventive Example 20 | $Li_{1.7}Y_{0.5}Zr_{0.7}Cl_6$ | Cl | 0.7 | 0.2 | Zr | BM | 2.5 |
| Inventive Example 21 | $Li_{1.1}Y_{0.7}Zr_{0.7}Cl_6$ | Cl | 0.7 | 0.4 | Zr | BM | 1 |
| Inventive Example 22 | $Li_{2.9}Y_{0.9}Hf_{0.1}Cl_6$ | Cl | 0.1 | 0 | Hf | BM | 7.8 |
| Inventive Example 23 | $Li_{2.5}Y_{0.5}Hf_{0.5}Cl_6$ | Cl | 0.5 | 0 | Hf | BM | 10.2 |
| Inventive Example 24 | $Li_{2.1}Y_{0.1}Hf_{0.9}Cl_6$ | Cl | 0.9 | 0 | Hf | BM | 7.5 |
| Inventive Example 25 | $Li_{1.3}Y_{0.9}Hf_{0.5}Cl_6$ | Cl | 0.5 | 0.4 | Hf | BM | 0.7 |
| Inventive Example 26 | $Li_{3.2}Y_{0.4}Hf_{0.4}Cl_6$ | Cl | 0.4 | −0.2 | Hf | BM | 3.2 |
| Inventive Example 27 | $Li_{1.8}Y_{0.6}Hf_{0.6}Cl_6$ | Cl | 0.6 | 0.2 | Hf | BM | 2 |
| Inventive Example 28 | $Li_{1.1}Y_{0.7}Hf_{0.7}Cl_6$ | Cl | 0.7 | 0.4 | Hf | BM | 0.67 |
| Inventive Example 29 | $Li_{2.5}Y_{0.5}Zr_{0.5}Cl_5Br$ | Cl, Br | 0.5 | 0 | Zr | BM | 18 |
| Inventive Example 30 | $Li_{2.5}Y_{0.5}Zr_{0.5}Cl_3Br_3$ | Cl, Br | 0.5 | 0 | Zr | BM | 2 |
| Inventive Example 31 | $Li_{2.5}Y_{0.5}Zr_{0.5}Cl_5I$ | Cl, I | 0.5 | 0 | Zr | BM | 20 |
| Inventive Example 32 | $Li_{2.5}Y_{0.5}Zr_{0.5}Cl_3I_3$ | Cl, I | 0.5 | 0 | Zr | BM | 2.8 |
| Inventive Example 33 | $Li_{2.5}Y_{0.5}Zr_{0.5}Cl_2Br_2I_2$ | Cl, Br, I | 0.5 | 0 | Zr | BM | 10 |
| Inventive Example 34 | $Li_{2.5}Y_{0.5}Hf_{0.5}Cl_3Br_3$ | Cl, Br | 0.5 | 0 | Hf | BM | 5.5 |
| Inventive Example 35 | $Li_{2.5}Y_{0.5}Hf_{0.5}Cl_3I_3$ | Cl, I | 0.5 | 0 | Hf | BM | 4.5 |
| Inventive Example 36 | $Li_{2.5}Y_{0.5}Hf_{0.5}Cl_2Br_2I_2$ | Cl, Br, I | 0.5 | 0 | Hf | BM | 8.5 |
| Inventive Example 37 | $Li_{2.9}Y_{0.9}Zr_{0.1}Cl_6$ | Cl | 0.1 | 0 | Zr | Sintering | 2 |
| Inventive Example 38 | $Li_{2.7}Y_{0.7}Zr_{0.3}Cl_6$ | Cl | 0.3 | 0 | Zr | Sintering | 7.5 |
| Inventive Example 39 | $Li_{2.5}Y_{0.5}Zr_{0.5}Cl_6$ | Cl | 0.5 | 0 | Zr | Sintering | 17 |
| Inventive Example 40 | $Li_{2.3}Y_{0.3}Zr_{0.7}Cl_6$ | Cl | 0.7 | 0 | Zr | Sintering | 2 |
| Inventive Example 41 | $Li_{2.1}Y_{0.1}Zr_{0.9}Cl_6$ | Cl | 0.9 | 0 | Zr | Sintering | 0.5 |
| Comparative Example 1 | $Li_2FeCl_4$ | Cl | | | | BM | 0.09 |

<<Discussion>>

From the comparison of the inventive examples 1 to 41 to the comparative example 1, it can be seen that, in the vicinity of room temperature, high ionic conductivity of not less than $1 \times 10^{-5}$ S/cm is exhibited in the inventive examples 1 to 41, whereas ionic conductivity in the comparative example 1 is less than $1 \times 10^{-5}$ S/cm.

In particular, if the value of a of the substitution amount of M defined by the formula (1) is within the range of 0.1≤a≤0.9, higher ionic conductivity is exhibited (see the inventive examples 1 to 41). In addition, as understood from (A) the inventive examples 1 to 5, (B) the inventive except for δ. In addition, if the value of δ is within the range of $-0.1 \leq \delta \leq 0.1$, higher ionic conductivity is exhibited.

In each of the inventive examples 1 to 41, the charge/discharge operation of the battery was performed at room temperature. On the other hand, in the comparative example 1, the discharge capacity was hardly provided, and the operation of the battery failed to be confirmed. Furthermore, since the materials of the inventive examples 1 to 41 do not include sulfur as a constituent element, hydrogen sulfide is not generated.

From the above, it is shown that the solid electrolyte material according to the present disclosure is an electrolyte material that does not generate hydrogen sulfide, exhibits high lithium ion conductivity, and can perform a good charge/discharge operation.

INDUSTRIAL APPLICABILITY

The battery of the present disclosure can be used as, for example, an all-solid lithium secondary battery.

REFERENTIAL SIGNS LIST

100 Solid electrolyte particles
201 Positive electrode
202 Electrolyte layer
203 Negative electrode
204 Positive electrode active material particles
205 Negative electrode active material particles
300 Pressure-molding die
301 Frame
302 Lower punch part
303 Upper punch part
1000 Battery

The invention claimed is:

1. A solid electrolyte material represented by the following composition formula (1)

$$Li_{3-3\delta-a}Y_{1+\delta-a}M_aCl_{6-x-y}Br_xI_y \quad \text{Formula (1)}$$

where
M is one or more kinds of elements selected from the group consisting of Zr, Hf, and Ti;
$-1<\delta<1$;
$0<a<1.5$;
$0<(3-3\delta-a)$;
$0<(1+\delta-a)$;
$0\leq x\leq 6$;
$0\leq y\leq 6$; and
$(x+y)\leq 6$.

2. The solid electrolyte material according to claim 1, wherein
$0.1\leq a\leq 0.9$ is satisfied.

3. The solid electrolyte material according to claim 2, wherein
$0.3\leq a\leq 0.7$ is satisfied.

4. The solid electrolyte material according to claim 1, wherein
$-0.4\leq\delta\leq 0.4$ is satisfied.

5. The solid electrolyte material according to claim 4, wherein
$-0.2\leq\delta\leq 0.2$ is satisfied.

6. The solid electrolyte material according to claim 5, wherein
$-0.1\leq\delta\leq 0.1$ is satisfied.

7. A battery, comprising:
a positive electrode;
a negative electrode; and
an electrolyte layer provided between the positive electrode and the negative electrode,
wherein
at least one selected from the group consisting of the positive electrode, the negative electrode, and the electrolyte layer includes a solid electrolyte material according to claim 1.

* * * * *